(12) United States Patent
Kohlstrung et al.

(10) Patent No.: US 8,415,418 B2
(45) Date of Patent: Apr. 9, 2013

(54) RUBBER COMPOSITIONS WITH HIGH ELASTICITY

(75) Inventors: Rainer Kohlstrung, Plankstadt (DE); Klaus Rappmann, Weinheim-Rittenweier (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/399,401

(22) Filed: Feb. 17, 2012

(65) Prior Publication Data

US 2012/0148856 A1 Jun. 14, 2012

Related U.S. Application Data

(63) Continuation of application No. PCT/EP2010/061484, filed on Aug. 6, 2010.

(30) Foreign Application Priority Data

Aug. 18, 2009 (DE) .......... 10 2009 028 607

(51) Int. Cl.
*C08K 5/01* (2006.01)

(52) U.S. Cl. .................. 524/476; 524/483

(58) Field of Classification Search .......... 524/476, 524/483
See application file for complete search history.

(56) References Cited

U.S. PATENT DOCUMENTS

| 4,600,745 | A | 7/1986 | Creighton |
| 5,256,738 | A | 10/1993 | Chasser et al. |
| 7,902,298 | B2 | 3/2011 | Kohlstrung et al. |
| 7,960,474 | B2 | 6/2011 | Kohlstrung et al. |
| 2004/0052951 | A1 * | 3/2004 | Sauer et al. ........ 427/385.5 |

FOREIGN PATENT DOCUMENTS

| CA | 2000569 | 4/1990 |
| DE | 102006016577 | 10/2007 |
| DE | 102007029644 | 1/2009 |
| DE | 3834818 | 2/2012 |
| DE | 102006014190 | 2/2012 |
| EP | 97394 | 1/1984 |
| EP | 441244 | 5/1994 |
| WO | 9623040 | 8/1996 |
| WO | 0247901 | 6/2002 |
| WO | 0248255 | 6/2002 |
| WO | 2009000735 | 12/2008 |

* cited by examiner

*Primary Examiner* — Ling Choi
*Assistant Examiner* — Wenwen Cai
(74) *Attorney, Agent, or Firm* — Steven C. Bauman; James E. Piotrowski

(57) ABSTRACT

Heat-curing reactive composition based on natural and/or synthetic polymers containing olefinic double bonds, and vulcanizing agents, which composition contains a) at least one liquid cis-1,4-polyisoprene with a weight-average molecular weight of between 20000 and 70000, b) a vulcanization system, c) at least one polybutadiene liquid at 22° C., in which the liquid cis-1,4-polyisoprene a) constitutes a proportion of the entire composition in the range from 9 to 15 wt. %, the vulcanization system b) is selected from the group consisting of: b1) sulfur and one or more vulcanization accelerator(s), b2) peroxide or disulfide vulcanization systems, b3) quinones, quinone dioximes or dinitrosobenzene, and the polybutadiene c) liquid at 22° C. constitutes a proportion of the entire composition in the range from 16 to 29 wt %.

17 Claims, 1 Drawing Sheet

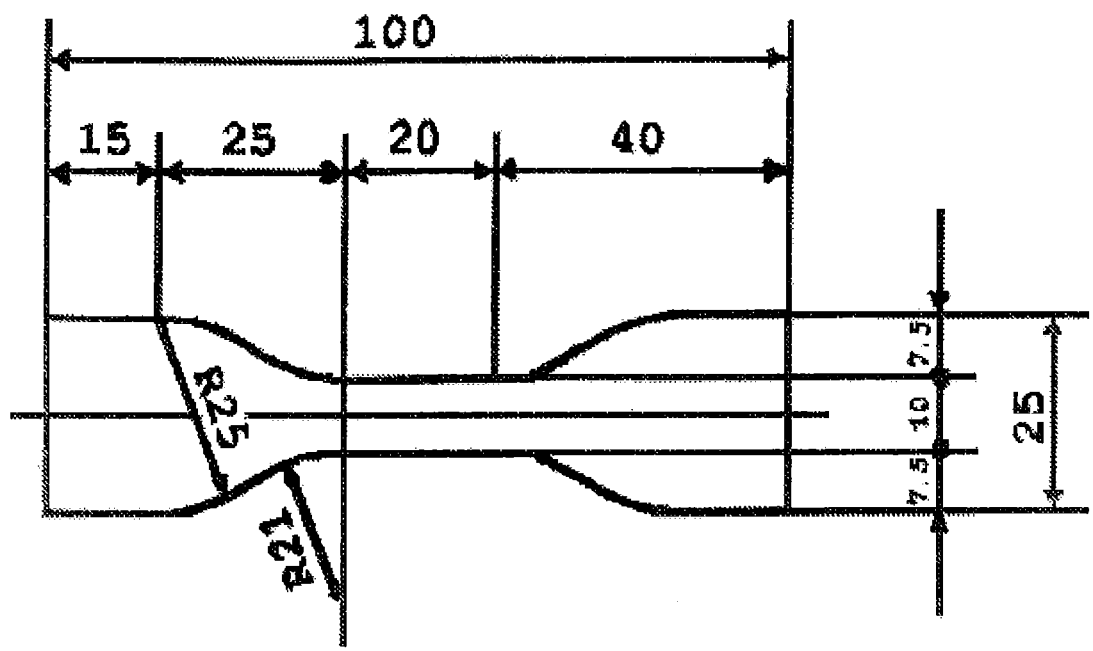

RUBBER COMPOSITIONS WITH HIGH ELASTICITY

The invention relates to single-component, heat-curable compositions based on liquid rubbers which exhibit plastisol-like flow behavior. They are suitable both as a flanged seam adhesive and as a flanged seam sealant in automotive body-in-white construction, so simplifying logistics and application technology. The invention furthermore relates to a vehicle in which flanged seams are adhesively bonded and/or sealed with the composition according to the invention once the latter has cured.

Adhesive bonding or sealing of sheet metal parts in vehicle construction, in particular in automotive vehicle bodies, is often carried out on unfinished sheet metal parts. The adhesives/sealants used for this purpose are subsequently cured in the paint drying ovens. Prior to this, the adhesively bonded or sealed parts pass through cleaning, phosphating and dip priming stages. The adhesives or sealants may be rinsed out of the adhesive joints by the treatment agents used in these stages. Various approaches have been disclosed for meeting these requirements, for example thermal/inductive precuring of low-viscosity, pasty adhesives/sealants, using adhesives in the form of solvent-containing compositions or hotmelts, as two-component products or also as shaped articles, which are generally applied manually and exhibit intrinsic tackiness at the time of application.

Low-viscosity, pasty adhesives/sealants may be used particularly straightforwardly by spray application or by spot application or also extrusion methods. Such products, in particular based on plastisols, are accordingly very often also used in body-in-white construction.

Plastisols are generally taken to be dispersions of organic plastics in plasticizers which gel on heating to relatively high temperatures and cure on cooling. The vast majority of plastisols currently still in general use contain finely pulverulent polyvinyl chloride (PVC) which is dispersed in a liquid plasticizer and forms a paste. Such polyvinyl chloride plastisols have the most varied applications. Applications include sealing compositions, for example for seam sealing metal containers or as flanged seam adhesives in the metalworking industry and as anticorrosion coatings for metals (for example as underbody sealant for motor vehicles). Plastisols based on finely pulverulent methacrylate copolymers (PMMA) or styrene copolymers are now also known. Such plastisols, in particular based on PVC or PMMA, are also extensively used in automotive body-in-white construction, for example for supporting stiffening structures such as hoods, trunk lids, doors and roof structures and for the adhesive bonding of flanged seams and for sealing seams produced by other joining methods. An advantageous feature of using plastisols for these applications is their favorable flow behavior, in particular at room temperature. In order to provide wash resistance in the various cleaning, phosphating and dip priming stages involved in the production of automotive bodies, these plastisol compositions are often partially gelled in a pregelling process to such an extent that their viscosity is sufficiently high to provide wash resistance for them and initial strength for the components.

For the purposes of the invention, the term "plastisol" relates exclusively to the rheological behavior and not to the composition of polymer powder(s) with plasticizer(s).

In recent times, compositions based on vulcanizable rubber mixtures have increasingly been proposed as alternative adhesives or sealants and sealing compounds. EP-B-97394 describes an adhesive mixture based on a liquid polybutadiene rubber, pulverulent sulfur, organic accelerators and optionally solid rubber. It is known that, by appropriate selection of the quantity of sulfur and accelerators, such adhesives based on liquid polybutadienes may achieve strengths which are equivalent to those of flexibilized epoxy adhesives. While these formulations have good curing characteristics and good ageing resistance and also exhibit relatively usable adhesion on normal oiled sheet steel, they cannot be used satisfactorily on the various kinds of galvanized sheet steel. Moreover, the elongation at break of these high strength rubber adhesives is very slight. They are not sprayable and have to be extruded at a relatively high temperature.

In order to improve adhesion, DE-C-3834818 proposes using OH-terminated polybutadienes for the liquid rubber. According to EP-B-441244, in addition to hydroxy-functional homo- or copolymers, the functional rubber polymer used may also be those with thiol, amino, amido, carboxyl, epoxy, isocyanate, anhydride or acetoxy groups, but the cured adhesive mixture exhibits an elongation at break which does not exceed 15%.

WO 96/23040 describes single-component, heat-curing structural adhesives based on liquid rubbers, which may optionally contain a proportion of functional groups, solid rubbers, thermoplastic polymer powders and sulfur and vulcanization accelerators. These are suitable for adhesively bonding metal parts. Tensile shear strengths of over 15 MPa simultaneously combined with an elevated elongation at break of over 15% may be obtained. These adhesives are in particular suitable for use in body-in-white construction in the automotive industry.

The rubber compositions of the above-stated prior art are in general highly suitable for use in body-in-white construction in automotive manufacture. They also exhibit excellent characteristics with regard to wash resistance, their ageing resistance and the required technical characteristics. One substantial disadvantage of these rubber compounds is however their very high viscosity, which means that they can as a rule only be applied by being pumped hot. They cannot be applied by conventional spraying methods, such as for example the airless method.

WO 2002/048255 discloses heat-curable rubber compositions which improve this situation. Said document provides a heat-curing reactive composition based on natural and/or synthetic liquid elastomers containing olefinic double bonds, and vulcanizing agents, these compositions containing at least one liquid cis-1,4-polyisoprene with a molecular weight of between 20000 and 70000 and a vulcanization system prepared from sulfur, accelerator and quinone oximes. In addition, this composition may contain at least one further liquid polyene from the group consisting of 1,2-polybutadiene, 1,4-polybutadiene, polyisoprene, polybutene, polyisobutylene, copolymers of butadiene and/or isoprene with styrene and/or acrylonitrile, copolymers of acrylic acid esters with dienes, the molecular weight of the liquid polyene being in the range from 900 to approx. 40000. The liquid polyene(s) may additionally comprise terminal and/or randomly distributed carboxyl groups, carboxylic anhydride groups, hydroxyl groups, amino groups, mercapto groups or epoxy groups as functional groups.

The elevated elasticity simultaneously combined with elevated strength (in particular tensile shear strength), which is necessary for simultaneous use as a flanged seam adhesive and as a flanged seam sealant, is however not generally achieved with the compositions disclosed in said document.

The object of the present invention is to achieve the following combination of objects:

provision of a rubber-based sealing and flanged seam adhesive for automotive construction with elevated elongation (>130%) simultaneously combined with elevated tensile shear strength (>4 MPa) having excellent ageing resistance.

the desired product is intended to be usable as a combination product for adhesive bonding and sealing of for example attached parts in automotive construction for use in body-in-white construction or on the painting line.

precuring of the product should be possible in the body-in-white oven at 120-150° C. for 8-30 minutes.

rapid application of the product by spraying or extrusion.

This combination of objects is achieved according to the invention by a heat-curing reactive composition based on natural and/or synthetic polymers containing olefinic double bonds, and vulcanizing agents, which composition contains a) at least one liquid cis-1,4-polyisoprene with a weight-average molecular weight of between 20000 and 70000 (in particular has a positive influence on the elevated elasticity of the composition)

b) a vulcanization system, c) at least one polybutadiene liquid at 22° C., wherein the liquid cis-1,4-polyisoprene a) constitutes a proportion of the entire composition in the range from 9 to 15 wt. %, the vulcanization system b) is selected from the group consisting of:

b1) sulfur and one or more vulcanization accelerator(s), b2) peroxide or disulfide vulcanization systems b3) quinones, quinone dioximes or dinitrosobenzene, and the polybutadiene c) liquid at 22° C. constitutes a proportion of the entire composition in the range from 16 to 29 wt. %.

The invention is based on the recognition that the stated object of the invention may be achieved by selecting suitable components in specific quantity ranges which, at least with regard to component c), lie outside the quantity ranges disclosed in WO 2002/048255.

For the purposes of the present invention, weight-average molecular weight ($M_w$) may be determined by means of gel permeation chromatography (GPC) with polystyrene as standard. The statement that a component is liquid at 22° C. relates to atmospheric pressure. Quantities stated in wt. % always relate to the entire composition.

In the polybutadiene c) liquid at 22° C., 60 to 90% of the double bonds preferably take the form of cis-1,4 double bonds. Its weight-average molecular weight is preferably in the range from 1500 to 3000.

The composition preferably additionally contains as further component d) 0.5 to 3.5 wt. %, relative to the entire composition, of stereospecific polybutadiene liquid at 22° C. with a 1,2-vinyl content in the range from 40 to 60% and with a weight-average molecular weight in the range from 1500 to 3000. Addition of this component facilitates establishing the desired combination of characteristics of the composition after curing, which makes the composition suitable both as a flanged seam sealant and as a flanged seam adhesive. This polymer in particular contributes to the necessary strength of the composition.

Adhesion of the composition according to the invention to metallic substrates is improved, if it contains as further component e) 2 to 8 wt. %, relative to the entire composition, of polybutadiene liquid at 22° C. with carboxylic or carboxylic anhydride groups and with a weight-average molecular weight in the range from 1500 to 3000. This is therefore a preferred embodiment of the present invention. If necessary, further tackifiers and/or coupling agents may additionally be added. Hydrocarbon resins, phenolic resins, terpene-phenolic resins, resorcinol resins or the derivatives thereof, modified or unmodified resin acids or esters (abietic acid derivatives), polyamines, polyaminoamides, anhydrides and anhydride-containing copolymers are, for example, suitable for this purpose. Adding small quantities of polyepoxy resins may also improve adhesion for many substrates. If tackifiers or coupling agent are used, the nature and quantity thereof depends on the polymer composition and the substrate onto which the composition is applied. Typical tackifying resins (tackifiers) such as terpene-phenolic resins or resin acid derivatives are used in concentrations of between 5 and 20 wt. %, while typical coupling agents such as polyamines, polyaminoamides or phenolic resins or resorcinol derivatives are used in the range between 0.1 and 10 wt. %.

The compositions according to the invention may optionally additionally contain finely divided thermoplastic polymer powders. Examples of suitable thermoplastic polymers are polypropylene, polyethylene, thermoplastic polyurethanes, methacrylate copolymers, styrene copolymers, polyvinyl chloride, polyvinyl acetal and in particular polyvinyl acetate and the copolymers thereof such as for example ethylene-vinyl acetate copolymers. Although the particle size or particle size distribution of the polymer powders does not appear to be particularly critical, the average particle size should be below 1 mm, preferably below 350 µm. The quantity of the optionally added thermoplastic polymer powder is between 0 and 20 wt. %, preferably between 2 and 10 wt. %.

The crosslinking or curing reaction of the rubber composition may have a decisive influence on sealing function and adhesive action. The vulcanization system must therefore be selected and adjusted with particular care. Suitable vulcanization systems encompass not only a numerous vulcanizing agents in combination with elemental sulfur, but also vulcanization systems without free sulfur. The latter include vulcanization systems based on disulfides, for example thiuram disulfides, organic peroxides, polyfunctional amines, quinones, quinone dioximes such as for example p-benzoquinone dioxime, p-nitrosobenzene and dinitrosobenzene or also crosslinking with (blocked) diisocyanates.

Very particularly preferred vulcanization systems are, however, those based on elemental sulfur, zinc oxide and organic vulcanization accelerators including organic zinc compounds. The pulverulent sulfur is here preferably used in quantities of 4 to 10 wt. %, relative to the total composition. Quantities of between 6 and 8 wt. % are particularly preferably used. Suitable organic accelerators are dithiocarbamates (in the form of the ammonium or metal salts thereof), xanthogenates, thiuram compounds (monosulfides and disulfides), thiazole compounds, aldehyde/amine accelerators (for example hexamethylenetetramine) and guanidine accelerators. Dibenzothiazyl disulfide (MBTS), 2-mercaptobenzothiazole (MBT), the zinc salt thereof (ZMBT) or diphenyl guanidine and zinc dibenzyl dithiocarbamate (ZBEC) are very particularly preferred. According to the invention, particularly advantageous vulcanization characteristics and final properties of the cured rubber compositions are obtained by selecting a combined vulcanization system of elemental sulfur and zinc compounds acting as accelerator, such as for example zinc salts of fatty acids, zinc dithiocarbamates, basic zinc carbonates and in particular finely divided zinc oxide. An accelerator system of zinc oxide, ZBEC and ZMBT is particularly preferred. The total content of zinc oxide and the stated organic compounds, in particular organic zinc compounds, is preferably in the range between 0.25 and 20 wt. %. Zinc oxide is here preferably used in quantities of 3 to 7 wt. %, in particular of 3.5 to 6 wt. %, ZBEC in quantities of 0.5 to 2 wt. %, in particular of 0.7 to 1.5 wt. %, and ZMBT in quantities of 0.2 to 1 wt. %, in particular of 0.3 to 0.7 wt. %, in each case relative to the entire composition.

The composition according to the invention furthermore preferably contains fillers. The fillers may be selected from a plurality of materials. Chalks, natural or ground calcium carbonates, calcium-magnesium carbonates, silicates, talcum, barytes and carbon black or graphite may in particular be mentioned. It may optionally be convenient for at least a proportion of the fillers to be surface pretreated. In particular with the various calcium carbonates or chalks, it has proven convenient to provide a coating of stearic acid in order to reduce introduced moisture and to reduce the cured composition's susceptibility to moisture. The composition preferably contains 25 to 55 wt. %, relative to the entire composition, of alkaline earth metal carbonate, preferably calcium carbonate (in particular in the form of chalk), which may be partially coated with fatty acid.

If desired, in order to achieve a further reduction in susceptibility to moisture, the compositions according to the invention may additionally contain up to 8 wt. %, preferably between 3 and 5 wt. %, relative to the entire composition, of calcium oxide.

The composition according to the invention furthermore preferably contains zinc oxide, quantities of in total up to 8 wt. %, relative to the entire composition, preferably of 2 to 6 wt. %, of zinc oxide being particularly preferred.

A combination of calcium oxide and zinc oxide as components according to the invention of the compositions is likewise preferred.

The composition according to the invention furthermore preferably contains, relative to the entire composition, in total up to 12 wt. %, preferably 5 to 9 wt. %, of carbon black and/or graphite.

In a further preferred embodiment of the present invention the compositions contain, relative to the entire composition, up to 5 wt. % of silica, preferably 0.5 to 3 wt. % of silica. For the purposes of this embodiment, it has proven particularly advantageous to use finely divided silica, preferably with an average particle size of less than 100 nm.

It has furthermore proved advantageous for the compositions according to the invention to contain a combination of calcium oxide, calcium carbonate and graphite. The compositions according to the invention particularly advantageously contain a combination of calcium oxide, zinc oxide, calcium carbonate and graphite. It is very particularly preferred for the compositions according to the invention to contain calcium oxide, zinc oxide, calcium carbonate, silica and graphite.

In order to achieve the desired adhesive strength, it is advantageous for the composition to contain, relative to the entire composition, no more than 10 wt. %, preferably no more than 5 wt. % and in particular no more than 2 wt. %, of organic compounds liquid at 22° C. (such as for example extender oils, white oil or plasticizers), which are non-chemically incorporated into the resultant polymer network during the curing reaction. Particularly preferably no more than 0.5 wt. % of and in particular no such compounds are present.

Conventional stabilizers or antioxidants, such as for example sterically hindered phenols or amine derivatives may be used against thermal, thermooxidative or ozone degradation of the compositions according to the invention, typical quantity ranges for these stabilizers being 0.1 to 5 wt. %.

In comparison with known rubber-based adhesives and sealants and sealing agents, the compositions according to the invention are distinguished by the absence of solid rubber. (As is known, solid rubbers have molecular weights of above 100000). This has a positive influence on rheological behavior and mechanical properties after hardening. Furthermore, the absence of solid rubber facilitates production, since there is no need to use a kneader as the mixing element for mastication. Simple dispersers, planetary or bar mixers are sufficient.

The essence of the invention is that the compositions according to the invention are simultaneously suitable both as a flanged seam sealant and as a flanged seam adhesive. A further aspect of the present invention accordingly relates to the use of a composition according to the invention as a flanged seam sealant, in particular in vehicle construction, and a further aspect relates to the use of a composition according to the invention as a flanged seam adhesive, in particular in vehicle construction. In particular, the composition according to the invention is simultaneously used both as a flanged seam sealant and as a flanged seam adhesive. A further aspect of the invention accordingly relates to a vehicle, in which flanged seams are adhesively bonded and/or sealed with a composition according to the invention once the latter has cured.

In comparison with the prior art, i.e. rubber-based products with plastisol-like flow behavior, the above-described rubber-based products exhibit very high elasticity (>130%) simultaneously combined with elevated strength (tensile shear strength >4 MPa). In addition, their good ageing resistance is a major advantage relative to PVC and/or PMMA plastisols.

Thanks to the above-stated elevated elasticity and strength values, it is possible to obtain higher quality, i.e. more stable and ageing resistant attached parts such as for example doors, hoods and tailgates; the higher elasticity of the product in use as a flanged seam sealant results in improved ageing and durability of the components in service. The higher strength (tensile shear strength or angle peel strength) during use of the product as a flanged seam adhesive makes a substantial contribution to the stability of the components.

The present invention furthermore gives rise to the following advantages:

reduction of logistical complexity when using the above-stated products as a (cosmetic) combined sealant/flanged seam adhesive product resulting in cost savings for the user. (Capital cost savings for example for robot application, since sealant and flanged seam adhesive may be applied with a single robot.)

precurability of the products for subsequent handling of the components at low temperatures.

combined use of the above-stated composition as a flanged seam adhesive and flanged seam sealant on the same component gives rise to the advantage that there is no incompatibility between the two applications and the flanged seam may consequently be completely filled or overfilled. This is associated with a distinct increase in quality and a higher "first-run rate".

EXEMPLARY EMBODIMENTS

Unless otherwise indicated, the quantities stated in the examples are weight percentages.

The raw materials according to Table I below were mixed together and the applicational and adhesive characteristics after curing were determined according to Tables II and III respectively.

Formulations V1 and V2 are comparative examples of a flanged seam sealant and a flanged seam adhesive respectively. In particular, relative to the comparative examples, formulations E1 to E8 according to the invention clearly exhibit elevated elongation at break simultaneously combined with elevated tear strength and tensile shear strength which make the cured compound suitable both as a flanged seam adhesive and as a flanged seam sealant.

FIG. 1 shows the test specimen used for carrying out the tear test (dimensions in mm).

TENSILE SHEAR STRENGTH TEST MEASUREMENT SETUP

Two 100×25×0.8 mm (galvannealed) steel specimens were wetted and adhesively bonded with the resultant adhesive with an overlap area 25×25 mm and a film thickness of 1.0 mm (spacers: glass beads). The specimens were then cured for 20 minutes at 170° C. After 24 h at room temperature, the tensile shear strength of the adhesive was tested to DIN EN 1465 with a speed of 50 mm/min.

T-Peel Test Measurement Setup:

Two 200×25×0.8 mm (galvannealed) steel specimens were wetted and adhesively bonded with the resultant adhesive with an overlap area 25×100 mm and a layer thickness of 0.15 mm (spacers: glass beads). The specimens were then cured for 20 minutes at 170° C.

After 24 h, the peel strength (T-peel) of the adhesive was tested to DIN EN ISO 11339 with a speed of 200 mm/min.

TABLE I

| Raw material | V1 | V2 | E1 | E2 | E3 | E4 | E5 | E6 | E7 | E8 |
|---|---|---|---|---|---|---|---|---|---|---|
| Liquid cis-1,4-polyisoprene, $M_w$ 29000 | 7 | 10 | 9.40 | 10.60 | 11.10 | 10.2 | — | — | — | — |
| Liquid cis-1,4-polyisoprene, $M_w$ 49000 | — | — | — | — | — | — | 10.60 | 10.60 | 15.00 | 10.60 |
| Polybutadiene with active carboxylic anhydride groups, MW approx. 1800-2400 | 2.7 | 2.5 | 5.40 | 5.30 | 5.30 | 5.32 | 5.30 | 5.30 | 5.30 | 5.30 |
| Liquid polybutadiene, MW approx. 1800, cis-1,4 content approx. 75% | 12.8 | 7 | 23.10 | 22.90 | 22.50 | 23.69 | 22.00 | 22.00 | 17.00 | 21.00 |
| Low molecular weight stereospecific polybutadiene, $M_n$ 1800, 1,2-vinyl content approx. 50% | 10.25 | 5 | 1.60 | 1.76 | 1.76 | 1.6 | 1.76 | 1.76 | 1.76 | 3.76 |
| CaO | 8 | 15 | 3.60 | 3.53 | 3.53 | 3.55 | 3.53 | 3.53 | 3.53 | 3.53 |
| ZnO | 8 | 15 | 4.50 | 4.42 | 4.42 | 4.44 | 4.42 | 4.42 | 4.42 | 4.42 |
| Antioxidant (e.g. 2,2-methylene-bis-(4-methyl-6-tert.-butylphenol)) | 0.5 | 0.5 | 0.44 | 0.44 | 0.44 | 0.44 | 0.44 | 0.44 | 0.44 | 0.44 |
| Chalk | — | 9.25 | 35.40 | 34.85 | 33.65 | 34.96 | 34.85 | 34.85 | 35.45 | 33.85 |
| Chalk, stearate-coated | 9.4 | 12 | — | — | 1.10 | — | 0.90 | 1.25 | — | — |
| Aerosil ® 200 | — | — | — | — | — | — | — | — | 1.25 | 1.25 |
| Graphite | — | 1 | 7.20 | 7.10 | 7.10 | 7.1 | 7.10 | 7.10 | 7.10 | 7.10 |
| Sulfur | 1.75 | 4.75 | 7.36 | 7.10 | 7.10 | 6.48 | 7.10 | 6.50 | 6.50 | 6.50 |
| Zinc dibenzyl dithiocarbamate (ZBEC) | 1 | — | 0.90 | 0.90 | 0.90 | 1.15 | 0.90 | 0.90 | 0.90 | 0.90 |
| Zinc 2-mercaptobenzothiazole (ZMBT) | 0.8 | — | 0.40 | 0.40 | 0.40 | 0.40 | 0.40 | 0.40 | 0.40 | 0.40 |
| Hexamethylene bis(thiosulfate) | — | 0.5 | 0.70 | 0.70 | 0.70 | 0.67 | 0.70 | 0.95 | 0.95 | 0.95 |
| Titanium dioxide | 3 | — | — | — | — | — | — | — | — | — |
| Technical white oil | 10.5 | 12 | — | — | — | — | — | — | — | — |
| Mercaptobenzothiazole (MBTS) | 4.5 | 5 | — | — | — | — | — | — | — | — |
| Magnesium-aluminum silicate | 19.3 | — | — | — | — | — | — | — | — | — |
| 65% p-benzoquinone dioxime, desensitized with mineral oil | 0.5 | 0.5 | — | — | — | — | — | — | — | — |
| | 100 | 100 | 100 | 100 | 100 | 100 | 100 | 100 | 100 | 100 |

TABLE II

| Characteristics before curing | V1 | V2 | E1 | E2 | E3 | E4 | E5 | E6 | E7 | E8 |
|---|---|---|---|---|---|---|---|---|---|---|
| Bingham viscosity η∞ at 35° C. (shear rate 0.01-10 1/s, plate/plate rotation 20 mm, plate spacing 0.2 mm, 60 s preliminary temperature adjustment, 30 points) [Pas] | 36.7 | 34.9 | 31.4 | 30.6 | 36.5 | 32.5 | 82.3 | 114.3 | 196 | 94.0 |
| Yield point at 35° C. [Pa] | 65.3 | 89.5 | 35.8 | 31.4 | 57.3 | 62.1 | 110.9 | 289.0 | 480 | 619.0 |

TABLE III

| Mechanical properties after curing for 20 min. at 170° C. | V1 | V2 | E1 | E2 | E3 | E4 | E5 | E6 | E7 | E8 |
|---|---|---|---|---|---|---|---|---|---|---|
| Elongation at break, thickness 2 mm, 50 mm/min [%] | 127 | 62 | 138 | 176 | 182 | 131 | 131 | 162 | 159 | 151 |
| Tear strength [MPa] | 0.61 | 2.5 | 4.8 | 4.9 | 5.0 | 4.7 | 5.4 | 5.1 | 4.9 | 5.2 |
| Tensile shear strength (25 × 25 × 1 mm), galvannealed, metal thickness 0.8 mm, 50 mm/min [MPa] | 0.6 | 4.75 | 4.50 | 4.30 | 4.90 | 4.00 | 4.80 | 5.40 | 4.1 | 4.40 |
| T-peel, 100 × 25 mm, galvannealed, layer thickness 0.15 mm, metal thickness 0.8 mm, 200 mm/min [N/mm] | — | 2.8 | 4.8 | 4.9 | 5.2 | 3.9 | 4.7 | 5.7 | 4.5 | 3.9 |

The invention claimed is:

1. A heat-curing reactive composition based on natural and/or synthetic polymers containing olefinic double bonds, and vulcanizing agents, which composition contains
   a) at least one liquid cis-1,4-polyisoprene with a weight-average molecular weight of between 20000 and 70000
   b) a vulcanization system
   c) at least one polybutadiene liquid at 22° C. wherein 60 to 90% of the double bonds take the form from cis-1,4 polymerization,
   wherein
      the liquid cis-1,4-polyisoprene a) constitutes a proportion of the entire composition in the range from 9 to 15 wt. %,
      the vulcanization system b) is selected from the group consisting of:
   b1) sulfur and one or more vulcanization accelerator(s),
   b2) peroxide or disulfide vulcanization systems
   b3) quinones, quinone dioximes or dinitrosobenzene, and
      the at least one polybutadiene c) liquid at 22° C. constitutes a proportion of the entire composition in the range from 16.8 to 29 wt. %.

2. The composition according to claim 1, wherein the at least one polybutadiene c) liquid at 22° C. has a weight-average molecular weight in the range from 1500 to 3000.

3. The composition according to claim 1, further containing
   d) 0.5 to 3.5 wt. %, relative to the entire reactive composition, of stereospecific polybutadiene liquid at 22° C. with a 1,2-vinyl content in the range from 40 to 60% and with a weight-average molecular weight in the range from 1500 to 3000.

4. The composition according to claim 1, further containing
   e) 2 to 8 wt. %, relative to the entire reactive composition, of polybutadiene liquid at 22° C. with carboxyl or carboxylic anhydride groups and with a weight-average molecular weight in the range from 1500 to 3000.

5. The composition according to claim 1, wherein it contains as vulcanization system b), relative to the entire composition,
   4 to 10 wt. % of sulfur and
   0.25 to 20 wt. % of vulcanization accelerator selected from one or more of zinc oxide, sulfur-containing organic compounds and organic zinc compounds.

6. The composition according to claim 1, further containing,
   f) 25 to 55 wt. %, relative to the entire reactive composition, of alkaline earth metal carbonate which may be partially coated with fatty acid.

7. The composition according to claim 1, further,
   g) up to 8 wt. %, relative to the entire reactive composition, of calcium oxide.

8. The composition according to claim 1, further containing,
   h) in total up to 12 wt. %, relative to the entire reactive composition, of carbon black and/or graphite.

9. The composition according to claim 1 containing no more than 10 wt. % of organic compounds that are liquid at 22° C. and which are non-chemically incorporated into a polymer network of the reactive composition formed during curing.

10. The composition according to claim 1 containing no more than 2 wt. %, of organic compounds that are liquid at 22° C. and which are non-chemically incorporated into a polymer network of the reactive composition formed during curing.

11. The composition according to claim 1, wherein the at least one polybutadiene liquid c) constitutes from 17 to 29 wt. % of the entire composition.

12. The composition according to claim 1, wherein the at least one polybutadiene liquid c) constitutes from 21 to 29 wt. % of the entire composition.

13. The composition according to claim 1, wherein it contains no solid rubber.

14. A flanged seam sealed by cured products of the reactive composition of claim 1.

15. A flanged seam comprising two components bonded by cured products of the reactive composition of claim 1.

16. The flanged seam of claim 15 wherein the two components are vehicle body panels.

17. A vehicle comprising components adhesively bonded and/or sealed by cured products of the reactive composition of claim 1.

* * * * *